(12) United States Patent
Zhu et al.

(10) Patent No.: US 9,369,984 B2
(45) Date of Patent: Jun. 14, 2016

(54) SYSTEM AND METHOD FOR POSITIONING IN A WIRELESS NETWORK

(75) Inventors: Chenxi Zhu, Gaithersburg, MD (US); Wei-Peng Chen, Santa Clara, CA (US)

(73) Assignee: Fujitsu Limited, Kawasaki-shi (JP)

( * ) Notice: Subject to any disclaimer, the term of this patent is extended or adjusted under 35 U.S.C. 154(b) by 1794 days.

(21) Appl. No.: 12/478,405

(22) Filed: Jun. 4, 2009

(65) Prior Publication Data

US 2009/0316601 A1    Dec. 24, 2009

Related U.S. Application Data

(60) Provisional application No. 61/074,386, filed on Jun. 20, 2008.

(51) Int. Cl.
| | |
|---|---|
| *H04W 64/00* | (2009.01) |
| *H04W 28/02* | (2009.01) |
| *H04W 48/16* | (2009.01) |
| *H04W 48/20* | (2009.01) |

(52) U.S. Cl.
CPC ........ *H04W 64/003* (2013.01); *H04W 28/0247* (2013.01); *H04W 48/16* (2013.01); *H04W 48/20* (2013.01)

(58) Field of Classification Search
USPC .......................................... 455/56.1, 456.34
See application file for complete search history.

(56) References Cited

U.S. PATENT DOCUMENTS

| | | | |
|---|---|---|---|
| 2007/0105568 A1* | 5/2007 | Nylander et al. ............. | 455/458 |
| 2007/0259624 A1* | 11/2007 | Alizadeh-Shabdiz et al. .......................... | 455/67.11 |
| 2009/0276155 A1* | 11/2009 | Jeerage et al. ................. | 701/214 |
| 2009/0286510 A1* | 11/2009 | Huber et al. .................. | 455/410 |
| 2009/0296635 A1* | 12/2009 | Hui et al. ...................... | 370/328 |

FOREIGN PATENT DOCUMENTS

| | | | |
|---|---|---|---|
| JP | 2009-232286 A | 10/2009 | ............ H04W 64/00 |
| WO | 2007/056738 A2 | 5/2007 | |
| WO | 2008/051124 A1 | 5/2008 | ............... H04Q 7/36 |

OTHER PUBLICATIONS

IEEE WirelessMAN® 802.16, Draft Standard for Local and metropolitan area networks, Part 16: Air Interface for Broadband Wireless Access Systems, P802.16Rev2/D7, Title Page, Introduction, Patents, Participants, Historical Information, Contents, List of Figures, List of Tables (pp. i-lxxiv), Chapter 1—Overview (pp. 1-8), Chapter 6—MAC Common Part Sublayer (pp. 45-498) and Chapter 9—Configuration (pp. 1133-1144), Oct. 2008.
Japanese Office Action, Application No. 2009-147046, with English Translation, 5 pages, Mar. 30, 2013.

* cited by examiner

*Primary Examiner* — Khalid Shaheed
(74) *Attorney, Agent, or Firm* — Baker Botts L.L.P.

(57) ABSTRACT

A method for wireless communication includes receiving a first scan report generated by a first node of a wireless communication network. The scan report includes identification information for a plurality of nodes coupled to the wireless communication network. The plurality of nodes comprises a second node whose location is unknown. The scan report also includes a plurality of time values, each time value corresponding to a communication time between the first node and each of the plurality of nodes. The method further includes determining a first plurality of distances using the first plurality of time values. Each distance of the first plurality of distances corresponds to a distance between the first node and each of the plurality of nodes. In addition, the method includes determining location information for the second node utilizing the plurality of distances. Further, the method includes providing a service to at least one wireless device utilizing the location information.

42 Claims, 3 Drawing Sheets

SYSTEM AND METHOD FOR POSITIONING IN A WIRELESS NETWORK

RELATED APPLICATION

This application claims benefit under 35 U.S.C. §119(e) of U.S. Provisional Application Ser. No. 61/074,386, entitled "MOBILE STATION ASSISTED POSITIONING OF FEMTO-BASE STATIONS IN A WIRELESS NETWORK," filed Jun. 20, 2008, by Chenxi Zhu et al.

TECHNICAL FIELD

This invention relates generally to wireless communication and more particularly to a system and method for positioning in a wireless network

BACKGROUND

IEEE 802.16 is an emerging suite of standards for Broadband Wireless Access (BWA) commonly known as WiMAX. WiMAX is one of the wireless technologies targeting the fourth generation of wireless mobile systems. The IEEE 802.16e amendment to the IEEE 802.16 base specification enables combined, fixed, and mobile operation in licensed and license-exempted frequency bands under 11 GHz. IEEE 802.16 defines a high-throughput packet data network radio interface capable of supporting several classes of Internet Protocol (IP) applications and services including isochronous applications such as Voice Over IP (VoIP) and applications with burst data access profiles such as Transfer Control Protocol (TCP) applications.

The basic WiMAX network coverage is provided using an approach similar to other mobile wireless technologies (e.g., using high power macro base stations). In order to increase the intra-cell coverage and capacity, distributed small base station entities have been considered. Depending on the number of target users and the type of applications envisioned, these small base station entities have been defined by the WiMAX industry as nano, pico or femto base stations.

The femto base station (fBS) is the smallest base station entity. An fBS is, in essence, a small WiMAX base station that a user can purchase and install in his home or office. It basically provides the user's MS the same air interface function as an mBS based on the IEEE 802.16 standard. Compared to a mBS, the fBS is a low-cost, low-power radio system having reduced capabilities. The users can put the FBS in their building to boost bandwidth and coverage area and enable new applications such as fixed/mobile convergence. Being located in the user's building, the fBS often provides higher signal strength and better link quality than the MS would get from the mBS outside the user's building.

SUMMARY

A method for wireless communication includes receiving a first scan report generated by a first node of a wireless communication network. The scan report includes identification information for a plurality of nodes coupled to the wireless communication network. The plurality of nodes comprises a second node whose location is unknown. The scan report also includes a plurality of time values, each time value corresponding to a communication time between the first node and each of the plurality of nodes. The method further includes determining a first plurality of distances using the first plurality of time values. Each distance of the first plurality of distances corresponds to a distance between the first node and each of the plurality of nodes. In addition, the method includes determining location information for the second node utilizing the plurality of distances. Further, the method includes providing a service to at least one wireless device utilizing the location information of the second node.

The method may include determining location information for a third node in response to determining the location information of the second node. The third node may not be a part of the plurality of nodes in the first scan report. The method may include facilitating authorization of the third node to access the wireless network in response to determining the location information of the third node. The first node may be an endpoint and the second node may be a femto base station.

A system for wireless communication includes an interface operable to receive a first scan report generated by a first node of a wireless communication network. The first scan report includes identification information for a plurality of nodes coupled to the wireless communication network. The plurality of nodes includes a second node whose location is unknown. The first scan report also includes a plurality of time values, each time value corresponding to a communication time between the first node and each of the plurality of nodes. In addition, the system includes a processor that is operable to determine a first plurality of distances using the first plurality of time values such that each distance of the first plurality of distances corresponds to a distance between the first node and each of the plurality of nodes. The processor is further operable to determine location information for the second node utilizing the plurality of distances. In addition, the processor is operable to facilitate the provision of a service to at least one wireless device utilizing the location information.

Depending on the specific features implemented, particular embodiments may exhibit some, none, or all of the following technical advantages. Network operators may not have to expend resources in installing equipment at the locations designated by a user of the network. In addition, network operators may be able to properly authenticate nodes of a network that have been installed by a user. Other technical advantages will be readily apparent to one skilled in the art from the following figures, description and claims.

BRIEF DESCRIPTION OF THE DRAWINGS

Reference is now made to the following description taken in conjunction with the accompanying drawings, wherein like reference numbers represent like parts and which.

DETAILED DESCRIPTION

Figure 1:
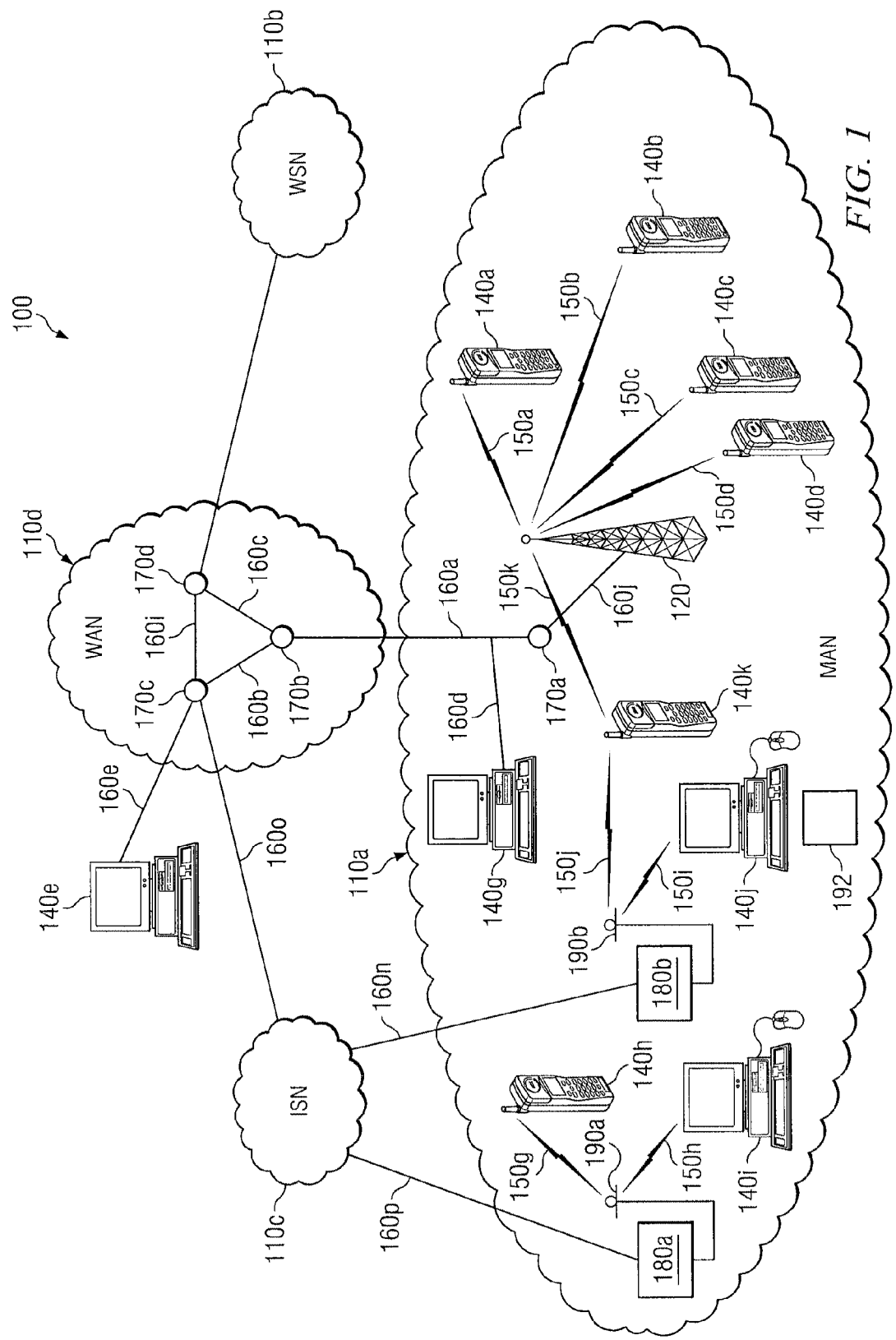
FIG. 1 illustrates one embodiment of a communication system comprising various communication networks.

FIG. 1 illustrates a communication system comprising various communication networks, in accordance with a particular embodiment. Communication system 100 may be comprised of multiple networks 110. Each network 110 may be any of a variety of communication networks designed to facilitate one or more different services either independently or in conjunction with other networks. For example, networks 110 may facilitate Internet access, wireless access (e.g., a WiMAX service) online gaming, file sharing, peer-to-peer file sharing (P2P), voice over Internet protocol (VoIP) calls, video over IP calls, or any other type of functionality typically provided by a network. Networks 110 may provide their respective services using any of a variety of protocols for either wired or wireless communication. For example, network 110a may comprise an 802.16 wireless network (e.g., 802.16j), popularly known as WiMAX, which may include macro base stations (mBSs), such as mBS 120, and femto base stations (fBSs), such as fBSs 190.

For simplicity and ease of discussion the remainder of this description may use a simplified nomenclature for the various entities that may be involved. 'Owner' may refer to the entity that has purchased an fBS or to whom the fBS is registered. 'User' may refer to the entity that is consuming wireless resources. 'Internet service' may refer to the service that the owner uses to access external networks, such as the Internet. While the term 'Internet' is used, it is used for simplicity and is not intended to be limited to only the Internet but includes any type of network, including public and private networks, that the fBS may use to establish its backhaul connection. 'Internet service provider' (ISP) may refer to the entity that provides the Internet service for the owner. 'Wireless service' or 'carrier service' may refer to the service that the user uses for wireless access, such as WiMAX. 'Wireless service provider' (WSP) may refer to the entity that provides the wireless service for the user or owner. While this nomenclature is used for simplicity, it does not represent the entire scope of all possible embodiments. For example, an owner may also be a user and the ISP may also be the WSP. As another example, the ISP may not be directly providing the owner with Internet access (e.g., the ISP may provide a building with Internet access, the building owner may then provide the fBS owner with Internet access).

The embodiment depicted in FIG. 1 includes fBSs 190. fBSs 190 may, in essence, be small base stations purchased (or leased) by the owner from the WSP. The owner is then responsible for installing the fBS, for example at his premise. Once installed the fBS provides a geographically small coverage area that may be used to enhance the signal coverage within the owner's premise. Depending on the scenario, the owner may share this coverage with other, unknown users (e.g., the fBS is a public fBS), or he may limit it to known/authorized users (e.g., the fBS is a private fBS).

The fBS is envisioned as being installed at the owner premise by the owner with little or no support from the WSP. This is different than other types of small base station entities, which are typically installed and commissioned by the WSP. Since fBSs are operated in a home or office environment, it may be natural to consider fBSs 190 as private equipment accessible only by the owners' endpoints 140. However, in certain situations the owner of an fBS may provide wireless service to endpoints 140 of non-owners. Such fBSs may be referred to as public accessible fBSs.

Because the owner may purchase the fBS from a WSP and install it in their home, or virtually at any location with a broadband connection, the WSP may have little or no control over the location of fBSs 190. Accordingly, the WSP may attempt to determine the location of fBS 190 as part of an fBS initialization and operation procedure. There may be at least two considerations that a WSP may have with respect to the location of the fBS:

1.) The fBS may only be authorized to operate in a geographic area where the WSP has a license to use the spectrum. Accordingly, the operator may need to know the location of the fBS with an accuracy of 10 km to meet the spectrum license requirement.

2.) The WSP may need to know the position of an fBS within the accuracy of 100 m in order to provide location-based services (e.g., E911) and to optimize the wireless operation of its wireless networks through radio resource management (e.g., assigning proper carrier/segment/subchannels and fBS transmission power based on interference coming from the other fBSs in the same neighborhood) to ensure quality of service levels.

Location server 192 may provide location information to the WSP of the various nodes within network 110a. Location server 192 may receive scan reports from various entities (such as mBS 120, fBS 190, and/or MS 140). Location server 192 may utilize the scan reports along with known locations of the various entities within network 110a to determine location information for nodes with unknown locations. Examples of the operation of location server 192 are described below with respect to FIGS. 2-4.

Fixed-mobile convergence (FMC) is the scenario where users can enjoy service continuity and service integration when they move between outdoor and indoor environments. fBSs 190 may facilitate FMC by allowing endpoints 140 to use a single wireless interface. More specifically, once fBS 190b, for example, is installed in the owner's home he is able to use the same mobile device with the same wireless interface to connect to either mBS 120 outside or fBS 190b inside. The selection of which device to connect to can be made manually by the user or autonomously by endpoint 140k, BS 120, or any component coupled to or controlled by WSN 110b.

Part of the installation process for the fBS may include providing it with Internet access for its backhaul connection. In the scenario depicted in FIG. 1, fBSs 190 are connected to network access devices 180. This connection may provide fBSs 190 with their backhaul connection to the WSP's network, wireless service network (WSN) network 110b. Network access devices 180 may provide the owner with general Internet access. fBSs 190 do not use dedicated backhaul communication lines associated with the WSP, but rather use the owner's existing Internet access. Depending on the embodiment and scenario the ISP and the WSP may be the same entity.

Each of endpoints 140 is connected to one of mBS 120 or fBSs 190. For simplicity, the component to which an endpoint is connected may be referred to as an access station. For example, the access station for endpoint 140e is fBS 190a. Between each endpoint 140 and its respective access station there may be a wireless connection 150, sometimes referred to as an access link. These wireless connections may be referred to as access links because they provide the endpoint with access to a network.

A wireless connection may comprise various wireless resources such as, for example, a combination of a particular center frequency, a particular bandwidth, a particular time slot, and/or a particular subchannel (for example, as described in a downlink or uplink map). In particular embodiments, it may be convenient to discuss the resources used by a link in terms of slots. Depending on the embodiment, a slot may comprise a particular number of subchannels and symbols (also known as time slots). For example, Section 8.4.3.1 of the Institute of Electrical & Electronics Engineers (IEEE) 802.16e-2005 Standard specifies a slot comprising a single subchannel and two symbols.

Although the example communication system 100 of FIG. 1 includes various different networks, networks 110a-110d, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110d may be implemented as a LAN, WAN, MAN, PSTN, WiMAX network, global distributed network such as the Internet, Intranet, Extranet, or any other form of wireless or wired networking.

Networks 110 may include any number and combination of wired links 160, wireless connections 150, nodes 170 and/or endpoints 140. For purposes of illustration, and only by way of example, network 110a is a MAN that may be implemented, at least in part, via WiMAX; network 110b is a PSTN; network 110c is a LAN; network 110d is a WAN, such as the Internet; network 110e is a wireless service network (WSN) which may be operated by the WSP responsible for providing network 110a with wireless service (e.g., WiMAX); and network 110f is an Internet service network (ISN) which may be operated by the ISP responsible for providing its users with Internet access. Though not depicted in FIG. 1, both WSN network 110e and ISN network 110f may include servers, modems, gateways and any other components that may be needed to provide their respective service.

While networks 110 have been depicted as four separate networks, depending on the scenario any two, or more, of the networks may be a single network. For example, the WSP and the ISP may be the same business entity which may maintain the necessary components for both services on the same network thus merging ISN network 110c and WSN network 110b into a single network. Furthermore, the interconnections between networks 110 may vary from those depicted in FIG. 1.

Generally, networks 110a-d provide for the communication of packets, cells, frames, or other portions of information (generally referred to as packets herein) between endpoints 140 and/or nodes 170 (described below). In particular embodiments, networks 110a-d may be IP networks. IP networks transmit data by placing the data in packets and sending each packet individually to the selected destination, along one or more communication paths. Network 110d may be coupled to network 110b through a gateway. Depending on the embodiment, the gateway may be a part of network 110b and/or 110d (e.g., nodes 170e and/or 170c may comprise a gateway).

Any of networks 110a-c may be coupled to other IP networks including, but not limited to, the Internet. Because IP networks share a common method of transmitting data, signals may be transmitted between devices located on different, but interconnected, IP networks. In addition to being coupled to other IP networks, any of networks 110a-c may also be coupled to non-IP networks through the use of interfaces or components such as gateways.

Networks 110 may be connected to each other and with other networks via a plurality of wired links 160, wireless connections 150, and nodes 170. The interconnection of networks 110 may enable endpoints 140 to communicate data and control signaling between each other as well as allowing any intermediary components or devices to communicate data and control signals. Accordingly, users of endpoints 140 may be able to send and receive data and control signals between and among each network component coupled to one or more of networks 110.

As noted above, wireless connections 150 may represent wireless links between two components using, for example, WiMAX. The extended range of a WiMAX mBS, along with one or more fBSs, in certain cases, may allow network 110a to cover the larger geographic area associated with a MAN while using a relatively small number of wired links. More specifically, by properly arranging mBS 120 and fBSs 190 around a metropolitan area, the multiple access stations may use wireless connections 150 or existing wired links to communicate with mBS 120, and wireless connection 150 to communicate with wireless endpoints 140 throughout the metropolitan area. mBS 120 may, through wired connection 160a, communicate with other mBSs, any components of network 110e, any network components not capable of establishing a wireless connection, and/or other networks outside of the MAN, such as network 110d or the Internet.

As mentioned above, the coverage quality of network 110a may be enhanced through the use of fBSs 190. More specifically, the relatively reduced range of a WiMAX fBS may allow network 110a to provide improved signal quality and/or capacity to users within smaller areas, for example within a building. fBSs 190 may be able to provide their access links through the use of existing network access. More specifically, an fBS 190 may connect to an owner's network access device 180. Once connected, fBS 190 may use the owner's Internet access, provided by the owner's ISP via the ISP's network (e.g., network 110c), for its backhaul connection to the WSP's network (e.g., network 110b).

Nodes 170 may include any combination of network components, modems, session border controllers, gatekeepers, ISN gateways, WSN gateways, security gateways, operation administration maintenance and provisioning (OAM&P) servers, network access provider (NAP) servers, base stations, conference bridges, routers, hubs, switches, gateways, endpoints, or any other hardware, software, or embedded logic implementing any number of communication protocols that allow for the exchange of packets in communication system 100. For example, node 170a may comprise another mBS that is wired to mBS 120 via link 160j and to network 110d via link 160a. As a mBS, node 170a may be able to establish several wireless connections of its own with various other mBSs and/or endpoints.

Network access devices 180 may provide Internet access to fBSs 190 through any combination of hardware, software embedded in a computer readable medium, and/or encoded logic incorporated in hardware or otherwise stored (e.g., firmware). In particular embodiments, network access device 180 may be supplied by the owner's ISP. For example, if the owner's ISP is a cable company then the ISP may supply a cable modem as the network access device 180. As another example, if the owner's ISP is a phone company then the ISP may supply an xDSL modem as the network access device 180. As may be apparent, network access device 180 may provide Internet access to components other than fBSs 190. For example, the owner may connect his personal computer to network access device 180 to access the Internet.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140a-140k may include a cell phone, an IP telephone, a computer, a video monitor, a camera, a personal data assistant or any other hardware, software and/or encoded logic that supports the communication of packets (or frames) using one or more of networks 110. Endpoints 140 may also include unattended or automated systems, gateways, other intermediate components or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
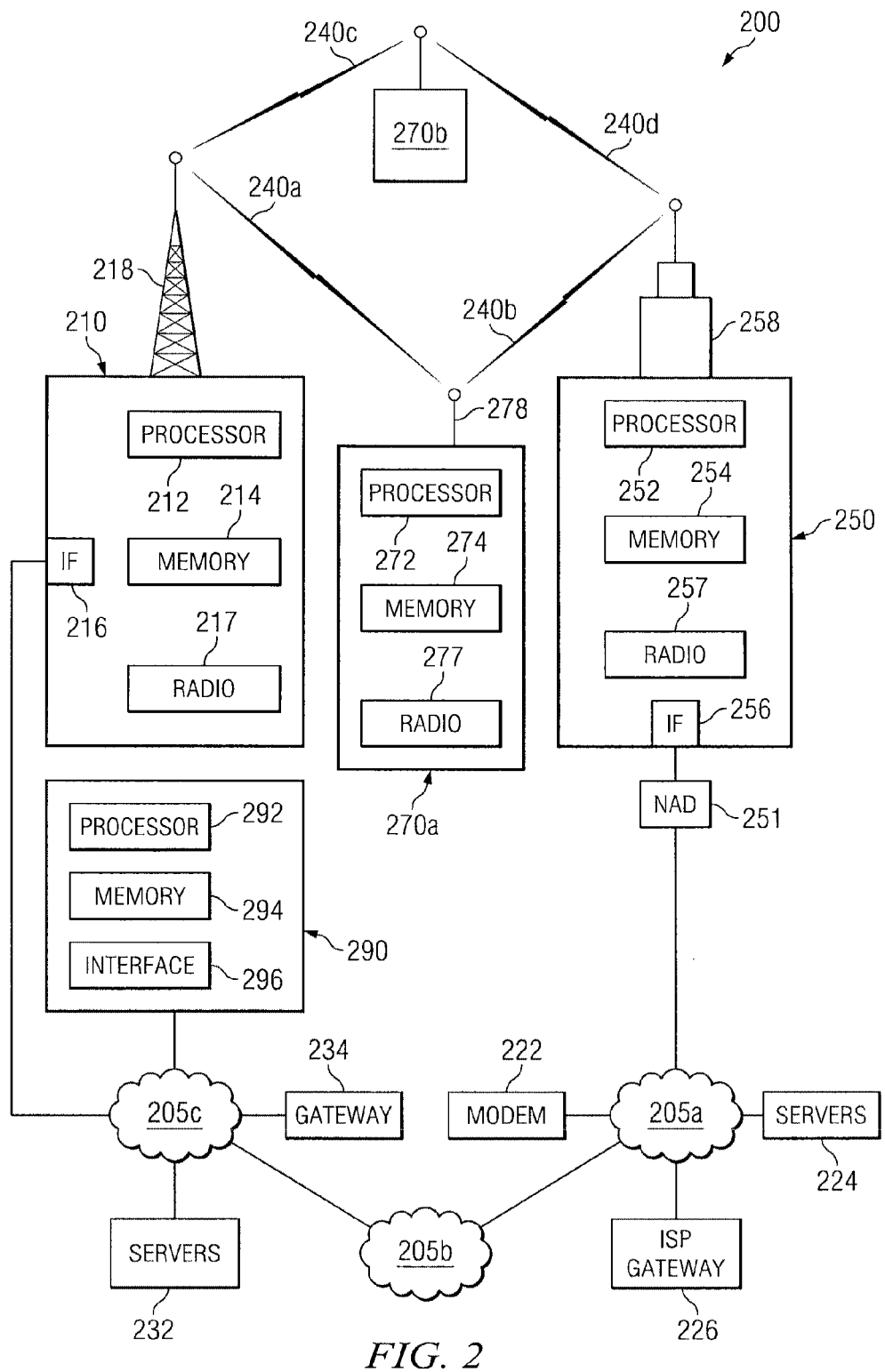
FIG. 2 illustrates one embodiment of a wireless network comprising an endpoint, a macro base station, a femto base station, and a location server.

FIG. 2 illustrates a wireless network comprising a more detailed view of an endpoint, a mBS, a fBS, and a location server in accordance with a particular embodiment. More specifically, the depicted embodiment is a simplified scenario comprising networks 205, mBS 210, fBS 250, network access device (NAD) 251, endpoints 270, and location server 290. In different embodiments network 200 may comprise any number of wired or wireless networks, mBSs, endpoints, location servers, fBSs, and/or any other components that may facilitate or participate in the communication of data and/or signals whether via wired or wireless connections. mBS 210, fBS 250, and location server 290 comprise processors 212, 252, and 292, memory 214, 254, and 294, communication interfaces 216, 256, and 296. mBS 210 and fBS 250 also comprise radios 217 and 257 and antennas 218 and 258. Similarly, endpoint 270a comprises processor 272, memory 274, radio 277, and antenna 278. Though not illustrated, endpoint 270b may be configured as endpoint 270a. These components may work together in order to provide wireless networking functionality, such as providing endpoints with wireless connections in a wireless network (e.g., a WiMAX wireless network).

Networks 205 may comprise separate but interconnected networks operated by one or more different operators. More specifically, network 205a may be the ISP's network. The owner of fBS 250 may use network 205a for Internet access. In providing the owner with network access, the ISP's network 205a may include modems 222, servers 224, and ISP gateway 226. Modems 222 may be used by the ISP to communicate with the owner's network access device 251. Thus, network access device 251 and modems 222 may have complimentary hardware and/or software that may enable them to communicate data between one another. Network access device 251 may act as the owner's access point, similar to network access device 180 discussed above with respect to FIG. 1. Modems 222 may act as a gateway between the ISP's network 205a and the owner's network access device 251. In particular embodiments, modems 222 may contain security gateway functionality. Servers 224 may comprise one or more servers such as OAM&P servers, Authorization, Authorization and Accounting (AAA) servers, Dynamic Host Configuration Protocol (DHCP) servers, or any other servers that the ISP may need to provide the owner with network access (or any other features provided by the ISP). ISP gateway 226 may comprise any hardware and/or software needed to couple network 205a with network 205b. For example, ISP gateway 226 may include switches, routers, firewalls, proxy servers, and other suitable equipment or software.

Network 205c may be a WiMAX service provider's network. Depending on the scenario, network 205c may be the user's or the owner's WiMAX service provider's network. In providing the WiMAX service, network 205c may utilize servers 232, gateway 234, and location server 290. Servers 232 may comprise one or more servers such as OAM&P servers, Network Access Provider (NAP) servers, AAA servers, Self Organizing Network (SON) servers or any other servers that the WiMAX provider may need to configure/authenticate fBS 250 and provide users with WiMAX service. For example, servers 232 may use location server 290 in order to configure/authenticate fBS 250. Location server 290 includes memory 294 which may include location information about nodes coupled to network 205c. Servers 232 may utilize the location information stored in location server 290 as part of allowing devices access to network 205c. Gateway 234 may comprise any hardware and/or software (such as switches, routers, firewalls, proxy servers) needed to couple network 205c with network 205b.

Networks 205a and 205c may be coupled via network 205b. In some embodiments, network 205b may be the Internet. Thus, in such embodiments, fBS 250 may connect to the WSP's network, network 205c, via the Internet. Though network 205b is depicted as a single network, it may comprise any number of the networks described above with respect to FIG. 1. For example, network 205b may comprise the Internet, a LAN, WAN, MAN, PSTN or some combination of the above.

Processors 212, 252, 272, and 292 may be microprocessors, controllers, or any other suitable computing devices, resources, or combinations of hardware, software and/or encoded logic operable to provide, either alone or in conjunction with other components, (e.g., memory 214, 254, 274, and/or 294) wireless networking functionality. Such functionality may include providing various wireless features discussed herein. For example, processors 212, 252, 272, and 292 may be able to determine the spectrum efficiency of one or more of wireless connections 240. Additional examples and functionality provided, at least in part, by processors 212, 252, 272, and 292 will be discussed below.

Memory modules 214, 254, 274, and 294 may be any form of volatile or non-volatile memory including, without limitation, magnetic media, optical media, random access memory (RAM), read-only memory (ROM), flash memory, removable media, or any other suitable local or remote memory component or components. Memory modules 214, 254, 274, and 294 may store any suitable data, instructions, logic or information utilized by mBS 210, fBS 250, endpoint 270, and location server 290 respectively, including software embedded in a computer readable medium, and/or encoded logic incorporated in hardware or otherwise stored (e.g., firmware). For example, in particular embodiments, memory modules 214, 254, 274, and 294 may store information regarding actual locations and authorized regions of nodes on networks 205. Memory modules 214, 254, 274, and 294 may also maintain a list, database, or other organization of data useful for determining whether a node should access networks 205 based on, at least, the location of the node. For example, a database of locations for various nodes of network 205c may be stored in memory 294 and be accessed by servers 232 in order to determine access privileges of a node to network 205c. In some embodiments, memory 294 may store program(s) which may facilitate receiving reports regarding nodes in network 205c and be able to analyze the reports and determine location information for the nodes. Additional examples of information and/or programs stored by memory modules 214, 254, 274, and 294 will be discussed below.

In some embodiments, the described processing and memory elements (such as processor 292 and 294) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

Radios 217, 257, and 277 may be coupled to or a part of antennas 218, 258, and 278, respectively. Radios 217, 257, and 277 may receive digital data that is to be sent out to other mBSs, fBSs, and/or endpoints via a wireless connection. Radios 217, 257, and 277 may convert the digital data into a radio signal having the appropriate center frequency and bandwidth parameters. These parameters may be predetermined, for example, by a combination of processor 212 and memory 214 of mBS 210. The radio signal may then be transmitted via antennas 218, 258, and 278 to the appropriate recipient. Similarly, radios 217, 257, and 277 may convert radio signals received via antennas 218, 258, and 278, respectively, into digital data to be processed by processors 212, 252, or 272, as appropriate.

Antennas 218, 258, and 278 may be any type of antenna capable of transmitting and receiving data and/or signals wirelessly. In some embodiments, antennas 218, 258, and 278 may comprise one or more omni-directional, sector or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Together, radio 217 and antenna 218, radio 257 and antenna 258, and radio 277 and antenna 278 may each form a wireless interface.

Communication interfaces 216, 256, and 296 may be used for the wired communication of signaling and/or data between mBS 210 and networks 205, between fBS 250 and networks 205 and between location server 290 and networks 205. For example, communication interface 216 may perform any formatting or translating that may be needed to allow mBS 210 to send and receive data from network 205c over a wired connection. As another example, communication interface 256 may comprise an interface (e.g., RJ-45) that is compatible with a corresponding interface on network access device 251, such as an Ethernet interface. While not depicted, endpoints 270 may also include wired interfaces.

As noted above with respect to fBSs 190, fBS 250 may, in essence, be a small base station providing a limited coverage area for a home or office. Depending on the embodiment and configuration of fBS 250 it may be public or private. fBS 250 may rely on the user's network access, via network access device 251, to provide the backhaul connection to network 205c, as opposed to the WiMAX service provider supplying the backhaul connection as is the case with mBS 210.

Network access device 251 may be used to provide the owner with Internet access. fBS 250 may utilize the Internet access for its backhaul connection to WiMAX network 205c. Depending on the type of network service and/or the user's service provider, network access device 251 may be a cable modem, a digital subscriber line (DSL) modem, a fiber optic modem, or any other modem, gateway or network access device provided by the owner's network service provider. The owner may have any number of routers, switches and/or hubs between fBS 250 and network access device 251. NAD 251 may also be configured to receive location information from network 205a and send the location information to fBS 250. For example, an operator within network 205a can associate NAD 251 to subscription information in a database with user or NAD 251 specific information, such as the NAD's 251 MAC address (serial number), or the username/password provided by the subscriber when he logs in.

As part of establishing a backhaul connection, fBS 250 may communicate with network access device 251. Network access device 251, which may be provided or authorized by the user's ISP, may provide fBS 250 with access to the ISP's network 205a which may then allow access to network 205c, via network 205b. Accessing network 205a may involve modem 241 communicating with the ISP's modems 222.

The ISP may operate one or more servers 224 (e.g., OAM&P, AAA, DHCP servers) in providing the user with Internet access. For example, the user may have a digital subscriber line (DSL) account for network access with a DSL provider. Servers 224 may ensure that the user has paid his bills and is otherwise in good standing with the DSL provider.

ISP gateway 226 may connect ISP network 205a with the Internet (e.g., network 205b). This may allow fBS 250 to access WiMAX network 205c via the Internet. In connecting network 205a with the Internet, gateway 226 may perform any necessary formatting and/or security functions.

WiMAX network 205c may have its own gateway 234 and servers 232. Similar to the servers and gateways of ISP network 205a, gateway 234 and servers 232 may ensure that the user has a valid WiMAX account and that network 205c is able to communicate with other networks, such as network 205b. Servers 232 may also contain information, data, instructions and/or logic that may be used to provision various features and functionality of fBS 250. For example, they may provide fBS 250 with channel information for its wireless connection 240b with endpoint 270a. In addition, location server 290 may be similarly configured as servers 232. As described further below, location server 290 may aid in the authentication of fBS 250 by providing location information pertaining to fBS 250.

Endpoints 270 may be any type of wireless endpoints able to send and receive data and/or signals to and from mBS 210 and/or fBS 250. Some possible types of endpoints 270 may include desktop computers, PDAs, cell phones, smart phones, laptops, and/or VoIP phones.

In some embodiments, fBS 250 may be installed by a user at a location of the user's choosing. Thus, a wireless service provider (WSP) associated with network 205c may have little or no control over the location of fBSs, such as fBS 250. Determining the location of fBS 250 may allow for the provision of one or more services in various embodiments. For example, the WSP and/or fBS 250 may need to know the position of fBS 250 in order to provide location-based services (e.g., E911) and to optimize the wireless operation of its wireless networks through radio resource management (e.g., assigning proper carrier/segment/subchannels and fBS transmission power based on interference coming from the other fBSs in the same neighborhood) to ensure quality of service levels. In some embodiments, the WSP and/or fBS 250 may provide local points-of-interest (POI) information.

The following examples may help to illustrate how location information of nodes within network 205c may be determined. In one example embodiment, endpoint 270a may perform a scan of surrounding nodes utilizing radio 277 and antenna 278 according to an algorithm stored in memory 274 and executed by processor 272. In some embodiments, this may be in response to a request from an mBS, such as mBS 210. The scan may receive information (including identifiers) from surrounding nodes, such as mBS 210 and fBS 250. Location information for one or more of these nodes may be unknown. Endpoint 270a may also be configured to track the elapsed time between the initiation of the scan and the responses by the various nodes in memory 274. Endpoint 270a may send these timings as well as the identifiers to location server 290 using radio 277 and/or antenna 278 through network 205c. In some circumstances, this may be accomplished by using fBS 250 and its connection to network 205a provided by NAD 251. In other circumstances, endpoint 270a may transmit this information to mBS 210 which may then utilize network 205c to transmit the information to location server 290.

Location server 290 may receive the identifiers and associated timings transmitted by endpoint 270a through interface 296. Location server 290 may process these timings and determine distances between endpoint 270a and the nodes encountered in the scan. By referencing location data location server 290 has previously stored, location server 290 may correlate these distances to determine location information for nodes whose location is currently unknown. As location server 290 receives more of such transmissions, location server 290 may be able to ascertain the location for other nodes whose locations are unknown or refine already-stored location information for nodes. Further details regarding these embodiments are described below with respect to FIGS. 3 and 4.

Thus far several different embodiments and features have been presented. Particular embodiments may combine one or more of these features depending on operational needs and/or component limitations. For example, a particular embodiment may use scan report(s) from endpoints within the network to determine location information for various nodes in the network, such as fBSs in the network. Some embodiments may include additional features.

Figure 3:
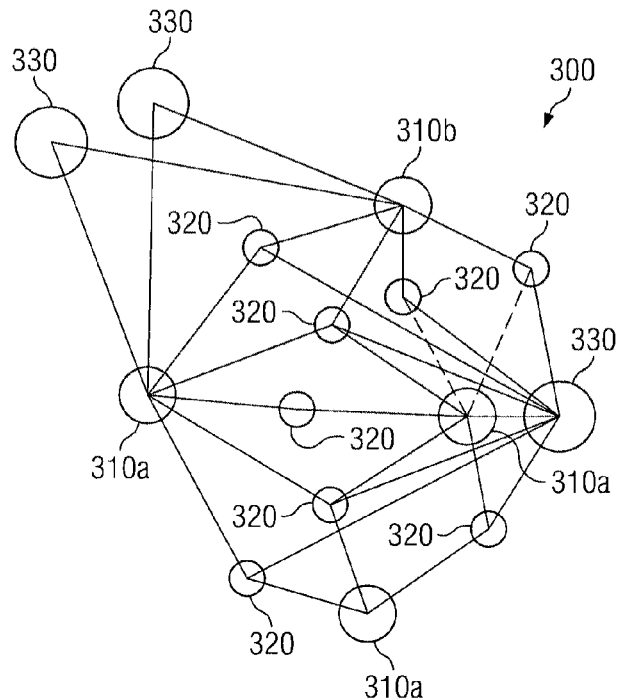
FIG. 3 illustrates one embodiment of a communication system conducting scans between nodes.

FIG. 3 illustrates one embodiment of a network 300 including various nodes. The nodes include femto base stations (fBS) 310, endpoints 320, and macro base station (mBS) 330. Each of these nodes may be configured as described above with respect to FIGS. 1 and 2. Each endpoint 320 may initiate a scan of nodes in range within network 300. The lines connecting endpoints 320 to the other nodes indicate that those nodes are within range of the scan executed by endpoints 320. Location information regarding these nodes may be stored on a server, such as location server 290. Some of the nodes may not have location information stored at such a server. By scanning nodes in range and transmitting scan reports, endpoints 320 may provide enough information for a server, such as location server 290, to determine location information for nodes which do not have location information stored at a server. For example, location information regarding fBS 310b may not be stored in a server while location information regarding fBSs 310a may be stored in a server. However, it may be in range for a scan conducted by four endpoints 320 as depicted. Each of these endpoints 320 may submit a scan report which includes information about fBS 310b. The information may include a time to respond to the scan. Based on this information, as further described below, a server (such as location server 290) may be able to determine location information for fBS 310b.

Figure 4:
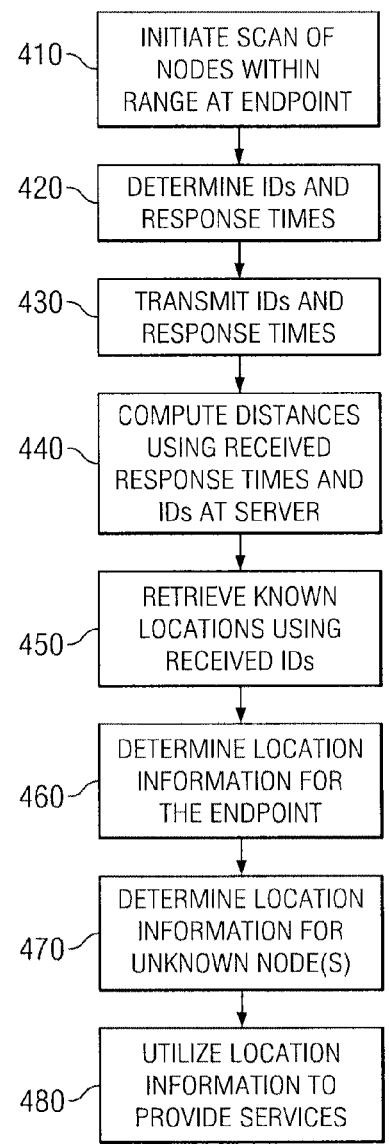
FIG. 4 is a flowchart illustrating one embodiment of determining location information for a node in a communication network.

FIG. 4 is a flowchart illustrating one embodiment of a method for determining location information. In general, the steps illustrated in FIG. 4 may be combined, modified, or deleted where appropriate, and additional steps may also be added to the example operation. Furthermore, the described steps may be performed in any suitable order.

At step 410, a node performs a scan of its surrounding base stations (such as macro base stations or femto base stations). The scan may be performed by an endpoint, such as any one of endpoints 320. As depicted in FIG. 3, the scan may exclude nodes that are outside the range of the node conducting the scan. In some embodiments, the scan may be conducted in response to a request by another node, such as an mBS. For example, mBS may request a scan using a MOB_SCN-RSP message according to certain IEEE 802.16 protocols in which the mBS may request that the scanning node provide a path delay information with respect to communication between the scanning node and the scanned nodes, including the mBS issuing the request. The scan may be implemented by a SCAN ranging procedure according to certain IEEE 802.16 protocols. The scanning node may be configured to perform the scan periodically or upon request by an mBS.

At step 420, the scanning node may determine response times and identifiers for the scanned nodes. In some embodiments, the scanned nodes report to the scanning node once they have received the scan by the scanning node. The scanned nodes may communicate an identifier to the scanning node. The scanning node may tabulate the received identifiers as well as the time it took to receive the response from each of the scanned nodes. At step 430, the scanning node may transmit this information to a server, such as location server 290. The server could be colocated with the Access Service Network Gateway or a network OAM server. In some embodiments, the scanning node may transmit the information to an mBS. The mBS may transmit the report to a server such as location server 290. In some embodiments, the scanning node may use a MOB_SCN-REP message according to certain IEEE 802.16 protocols and may include the IDs and path delay times of the scanned nodes. The scanning node may also include an identifier of the mBS which is serving the node (if the scanning node is an endpoint) and the current time.

At step 440, a server, such as location server 290, which receives the report transmitted at step 430 may use the information to compute relative distances between the scanned nodes and the scanning node. In some embodiments, the server may use the reported delay times and identifiers to determine the distances between the scanned nodes and the scanning node.

At step 450, the server may retrieve location information associated with the scanned nodes in the received report. This step may be performed before, during, or after step 440. The location information may be retrieved from a memory module within the server (such as memory 294) or another storage medium coupled to the server utilizing the identifiers in the report. The location information for certain nodes (such as mBSs) may be stored since the nodes are fixed. The location information for other nodes (such as fBSs) may have been previously determined according to an algorithm similar to that depicted in FIG. 4 or by other means. Certain nodes may not have location information stored within a memory module. Thus, in some embodiments, after this step is completed, the server may have a set of nodes for which location information is known and a set of nodes for which location information is not known.

At step 460, the server may determine the location of the scanning node, such as an endpoint, which submitted the report. In some embodiments, the server may first determine if the scan report contains at least three scanned base station nodes, which may be mBSs or fBSs. If the report does not contain at least three such nodes, the report may be discarded. If the report does contain at least three such nodes, the server may use the location information and the computed distances between the scanning node and at least three such nodes to determine a location for the scanning node using a method such as triangulation. This may be accomplished by retrieving stored location information for the at least three such nodes (e.g., as described in step 450).

At step 470, the server may determine a location for a node with unknown location information. In some embodiments, the server may update the location information for a particular node. For example, as discussed above with respect to FIG. 3, a node such as fBS 310b may be at an unknown location. Using the received scan report (and/or other scan reports)

which include fBS 310*b*, the location server may be able to determine a location for fBS 310*b*. The server may use the following formula in determining location information for a node such as fBS 310*b*:

$$(x_{MS_i} - x_{BS_j})^2 + (y_{MS_i} - y_{BS_j})^2 = D_{MS_i\text{-}BS_j}^2$$

where $D_{MSi\_BSj}$ is the distance between node $MS_i$ and node $BS_j$, $x_{MSi}$ and $y_{MSi}$ are the coordinates for $MS_i$, and $x_{BSj}$ and $y_{BSj}$ are the coordinates for node $BS_j$. The following information may be used by the server with another algorithm: the number (F) of nodes with unknown positions that need to be determined, the number (R) of nodes with known positions, and the number (M) of nodes that sent a scan report which include delay information for at least three nodes with known locations. The algorithm may be a series of equations with at least 3M equations (distances). Let the total number of equations be T, with 2M+2F unknown variables. The algorithm can be solved exactly if T=2M+2F, however when T>2M+2F, there may be more constraints than unknowns which may prevent it from being solved exactly. Particular embodiments may treat this as an over-determined system and try to solve it as an optimization problem. When the system is over-determined, particular embodiments may converted to a nonlinear programming problem. In such a scenario, the objective function may be chosen as follows. This problem (or its approximation) can be solved with known methods, such as according to the following statement:

$$\min \sum_{\forall i,j \text{ s.t. } D_{MS_i\_BS_j} \text{ is known,}} \left| (x_{MS_i} - x_{BS_j})^2 + (y_{MS_i} - y_{BS_j})^2 - D_{MS_i\_BS_j}^2 \right|^o,$$

$o = 1$ or 2.

Thus, in some embodiments, the server may continually update the system of equations as it receives scan reports. As locations are determined, the server may store the location information at a memory module located within the server or coupled to the server. The objective function above may be weighted with confidence levels based on the known location information of the nodes in the scan report. For example, if a node in the scan report has its position determined due to GPS technology, a higher weight may be given to the equation corresponding to this node. Continuing the example, a node in the scan report may have its location information inferred using steps similar to those presented here. The confidence level for such a node may cause a different weight to be applied to its respective equation. In some embodiments, nodes may be included in more than one scan report. The server may continue to proceed with the operations described above and be able to refine the location information for such nodes. The server may use Kalman filtering to update location information for the nodes as more scan reports are processed. With more reports, the accuracy of the location information may improve.

At step 480, location information determined in the above steps may be used to provide services to at least one wireless device. For example, the services may be provided to devices such as endpoints 270. The server that determined the location information may facilitate the provision of such services. In some embodiments, this may include directly providing the services to various nodes. The server may also facilitate the provision of the services by transmitting the determined location information to a node which will provide the services to wireless devices. For example, the location information may be transmitted to a server within the wireless network (such as servers 232) which may provide a service utilizing the location information. In some embodiments, the location information may be transmitted to an fBS so that the fBS may provide a service based on the location information.

The service provided utilizing the location information may include location based services. Examples of such services may be emergency services such as E-911 and providing local point of interest information (such as local directory information). In the situation where an fBS is providing the service, the fBS may also support more sophisticated forms of service such as those that relate to the actual premises upon which the fBS is installed. For example, if the fBS is installed at a shopping mall, the fBS may be able to provide information or offers related to the stores within the shopping mall (e.g., coupons). Other suitable location based services are contemplated as deliverable by the fBS utilizing the location information.

A network operator of the WSP may also provide services utilizing the location information. For example, the network operator may be configured to further authorize the fBS to provide services based on the determined location information. Such an authorization may occur in response to a situation where the determined location information is more precise than the location information previously known about the fBS. The network operator may also provide other services, such as those described above with respect to the fBS.

Although several embodiments have been illustrated and described in detail, it will be recognized that modifications and substitutions are possible without departing from the spirit and scope of the appended claims.

What is claimed is:

1. A method for wireless communication, comprising:
  receiving a first scan report generated by a first node of a wireless communication network, the scan report comprising:
    identification information for a plurality of nodes coupled to the wireless communication network, wherein the plurality of nodes comprises a second node whose location is unknown; and
    a plurality of time values, each time value corresponding to a communication time between the first node and each of the plurality of nodes;
  determining a first plurality of distances using the first plurality of time values, each distance of the first plurality of distances corresponding to a distance between the first node and each of the plurality of nodes;
  determining location information for the second node utilizing the plurality of distances; and
  utilizing the location information to provide a service to at least one wireless device.

2. The method of claim 1, further comprising determining location information for the first node based on the first scan report and wherein determining location information for the second node comprises utilizing the location information for the first node.

3. The method of claim 1, further comprising discarding the first scan report if the first scan report does not include information from at least three base stations.

4. The method of claim 1, further comprising:
  determining location information for a third node in response to determining the location information of the second node, wherein the plurality of nodes does not comprise the third node; and
  utilizing the location information for the third node to provide a service to at least one wireless device.

5. The method of claim 1, further comprising:
receiving a second scan report generated by a third node of the wireless communication network, the scan report comprising:
identification information for a second plurality of nodes coupled to the wireless communication network, wherein the second plurality of nodes comprises the second node; and
a second plurality of time values, each time value corresponding to a communication time between the third node and each of the second plurality of nodes;
determining a second plurality of distances using the second plurality of time values, each distance of the second plurality of distances corresponding to a distance between the third node and each of the second plurality of nodes; and
updating location information for the second node utilizing the second plurality of distances.

6. The method of claim 5, wherein updating location information for the second node comprises utilizing a Kalman filter.

7. The method of claim 1, wherein the first node comprises an endpoint.

8. The method of claim 1, wherein the second node comprises a femto base station.

9. The method of claim 1, wherein the wireless communication network comprises a WiMAX network.

10. The method of claim 1, further comprising:
receiving a second scan report generated by a third node of the wireless communication network, the scan report comprising:
identification information for a second plurality of nodes coupled to the wireless communication network, wherein the second plurality of nodes comprises a fourth node that was included in the first scan report; and
a second plurality of time values, each time value corresponding to a communication time between the third node and each of the second plurality of nodes;
determining a second plurality of distances using the second plurality of time values, each distance of the second plurality of distances corresponding to a distance between the third node and each of the second plurality of nodes; and
determining location information for the fourth node utilizing the first and second plurality of distances.

11. The method of claim 1, wherein utilizing the location information to provide the service to the at least one wireless device comprises providing at least one location based service to the at least one wireless device.

12. The method of claim 11, wherein the at least one location based service comprises emergency services.

13. The method of claim 11, wherein the at least one location based service comprises providing information regarding local points of interest.

14. The method of claim 1, wherein utilizing the location information to provide the service to the at least one wireless device comprises facilitating authorization of the second node to utilize the wireless network.

15. A system for wireless communication, comprising:
an interface operable to receive a first scan report generated by a first node of a wireless communication network, the scan report comprising:
identification information for a plurality of nodes coupled to the wireless communication network, wherein the plurality of nodes comprises a second node whose location is unknown; and
a plurality of time values, each time value corresponding to a communication time between the first node and each of the plurality of nodes; and
a processor operable to:
determine a first plurality of distances using the first plurality of time values, each distance of the first plurality of distances corresponding to a distance between the first node and each of the plurality of nodes;
determine location information for the second node utilizing the plurality of distances; and
facilitate the provision of a service to at least one wireless device utilizing the location information for the second node.

16. The system of claim 15, wherein the processor is further operable to determine location information for the first node based on the first scan report and wherein determining location information for the second node comprises utilizing the location information for the first node.

17. The system of claim 15, wherein the processor is further operable to discard the first scan report if the first scan report does not include information from at least three base stations.

18. The system of claim 15, wherein the processor is further operable to:
determine location information for a third node in response to determining the location information of the second node, wherein the plurality of nodes does not comprise the third node; and
facilitate the provision of a service to at least one wireless device utilizing the location information for the third node.

19. The system of claim 15, wherein:
the interface is further operable to receive a second scan report generated by a third node of the wireless communication network, the scan report comprising:
identification information for a second plurality of nodes coupled to the wireless communication network, wherein the second plurality of nodes comprises the second node; and
a second plurality of time values, each time value corresponding to a communication time between the third node and each of the second plurality of nodes; and
the processor is further operable to:
determine a second plurality of distances using the second plurality of time values, each distance of the second plurality of distances corresponding to a distance between the third node and each of the second plurality of nodes; and
update location information for the second node utilizing the second plurality of distances.

20. The system of claim 19, wherein updating location information for the second node comprises utilizing a Kalman filter.

21. The system of claim 15, wherein the first node comprises an endpoint.

22. The system of claim 15, wherein the second node comprises a femto base station.

23. The system of claim 15, wherein the wireless communication network comprises a WiMAX network.

24. The system of claim 15, wherein:
the interface is further operable to receive a second scan report generated by a third node of the wireless communication network, the scan report comprising:
identification information for a second plurality of nodes coupled to the wireless communication network, wherein the second plurality of nodes comprises a fourth node that was included in the first scan report; and a second plurality of time values, each time value corresponding to a communication time between the third node and each of the second plurality of nodes; and the processor is further operable to:

determine a second plurality of distances using the second plurality of time values, each distance of the second plurality of distances corresponding to a distance between the third node and each of the second plurality of nodes; and determine location information for the fourth node utilizing the first and second plurality of distances.

25. The system of claim 15, wherein the service comprises at least one location based service.

26. The system of claim 25, wherein the at least one location based service comprises emergency services.

27. The system of claim 25, wherein the at least one location based service comprises providing information regarding local points of interest.

28. The system of claim 15, wherein the service comprises facilitating authorization of the second node to utilize the wireless network.

29. A tangible, non-transitory computer-readable medium comprising instructions that, when executed by a processor, cause the processor to:

receive a first scan report generated by a first node of a wireless communication network, the scan report comprising:

identification information for a plurality of nodes coupled to the wireless communication network, wherein the plurality of nodes comprises a second node whose location is unknown; and a plurality of time values, each time value corresponding to a communication time between the first node and each of the plurality of nodes;

determine a first plurality of distances using the first plurality of time values, each distance of the first plurality of distances corresponding to a distance between the first node and each of the plurality of nodes;

determine location information for the second node utilizing the plurality of distances; and facilitate the provision of a service to at least one wireless device utilizing the location information.

30. The medium of claim 29, further comprising instructions that cause the processor to determine location information for the first node based on the first scan report and wherein determining location information for the second node comprises utilizing the location information for the first node.

31. The medium of claim 29, further comprising instructions that cause the processor to discard the first scan report if the first scan report does not include information from at least three base stations.

32. The medium of claim 29, further comprising instructions that cause the processor to:

determine location information for a third node in response to determining the location information of the second node, wherein the plurality of nodes does not comprise the third node; and facilitate the provision of a service to at least one wireless device utilizing the location information for the third node.

33. The medium of claim 29, further comprising instructions that cause the processor to:

receive a second scan report generated by a third node of the wireless communication network, the scan report comprising:

identification information for a second plurality of nodes coupled to the wireless communication network, wherein the second plurality of nodes comprises the second node; and a second plurality of time values, each time value corresponding to a communication time between the third node and each of the second plurality of nodes;

determine a second plurality of distances using the second plurality of time values, each distance of the second plurality of distances corresponding to a distance between the third node and each of the second plurality of nodes; and update location information for the second node utilizing the second plurality of distances.

34. The medium of claim 33, wherein updating location information for the second node comprises utilizing a Kalman filter.

35. The medium of claim 29, wherein the first node comprises an endpoint.

36. The medium of claim 29, wherein the second node comprises a femto base station.

37. The medium of claim 29, wherein the wireless communication network comprises a WiMAX network.

38. The medium of claim 29, further comprising instructions that cause the processor to:

receive a second scan report generated by a third node of the wireless communication network, the scan report comprising:

identification information for a second plurality of nodes coupled to the wireless communication network, wherein the second plurality of nodes comprises a fourth node that was included in the first scan report; and a second plurality of time values, each time value corresponding to a communication time between the third node and each of the second plurality of nodes;

determine a second plurality of distances using the second plurality of time values, each distance of the second plurality of distances corresponding to a distance between the third node and each of the second plurality of nodes; and determine location information for the fourth node utilizing the first and second plurality of distances.

39. The medium of claim 29, wherein the service comprises at least one location based service.

40. The medium of claim 39, wherein the at least one location based service comprises emergency services.

41. The medium of claim 39, wherein the at least one location based service comprises providing information regarding local points of interest.

42. The medium of claim 29, wherein the service comprises facilitating authorization of the second node to utilize the wireless network.

* * * * *